April 10, 1951 W. D. HOUGHTON 2,548,796
DOUBLE POLARITY PULSE GENERATOR SYSTEM
Filed June 2, 1947 6 Sheets-Sheet 1

INVENTOR.
WILLIAM D. HOUGHTON
BY Sarry Tunick
ATTORNEY

April 10, 1951 W. D. HOUGHTON 2,548,796

DOUBLE POLARITY PULSE GENERATOR SYSTEM

Filed June 2, 1947 6 Sheets-Sheet 2

INVENTOR.
WILLIAM D. HOUGHTON

BY Harry Tunick
ATTORNEY

April 10, 1951 W. D. HOUGHTON 2,548,796

DOUBLE POLARITY PULSE GENERATOR SYSTEM

Filed June 2, 1947 6 Sheets-Sheet 3

INVENTOR.
WILLIAM D. HOUGHTON

BY Harry Tunick

ATTORNEY

INVENTOR
WILLIAM D. HOUGHTON
BY Harry Tunick
ATTORNEY

April 10, 1951 W. D. HOUGHTON 2,548,796

DOUBLE POLARITY PULSE GENERATOR SYSTEM

Filed June 2, 1947 6 Sheets-Sheet 5

INVENTOR.
WILLIAM D. HOUGHTON

BY Harry Tunick

ATTORNEY

April 10, 1951 W. D. HOUGHTON 2,548,796

DOUBLE POLARITY PULSE GENERATOR SYSTEM

Filed June 2, 1947 6 Sheets-Sheet 6

INVENTOR.
WILLIAM D. HOUGHTON

BY Harry Tunick

ATTORNEY

Patented Apr. 10, 1951

2,548,796

UNITED STATES PATENT OFFICE 2,548,796

DOUBLE POLARITY PULSE GENERATOR SYSTEM

William D. Houghton, Port Jefferson, N. Y., assignor to Radio Corporation of America, a corporation of Delaware Application June 2, 1947, Serial No. 751,698

28 Claims. (Cl. 179—15)

This invention relates to multiplex communication systems.

In time division multiplex systems, the common transmission medium is sequentially allotted to different channels on a non-overlapping time basis. This common transmission medium may be a transmission line which feeds a radio transmitter. It is known to produce pulses in the different channel units or circuits and to modulate in each channel circuit a characteristic of these pulses; for example, the amplitude thereof. Where pulse amplitude modulation is employed, the system may be referred to by the symbols PAM, and the amplitude of the pulse generated in each channel circuit is varied in one type of PAM system plus and minus about a mean value in accordance with the instantaneous amplitude of the modulating signal at the time of pulse occurrence. When the modulating voltage on a channel is zero, the pulse generated for that channel has a fixed amplitude. When the amplitude of the modulating signal is positive, the pulse generated is greater or smaller in amplitude than the fixed value by an amount proportional to the amplitude of the modulating signal and depending upon the phase characteristics of the modulating circuits. When the modulating signal is negative, the amplitude of the pulse generated is lower or greater than the fixed amplitude value by an amount proportional to the amplitude of the modulating signal and depending upon the phase characteristics of the modulating circuits. In such a system, the pulses generated are always in one direction with respect to zero, and always have a finite value. The pulses may be all positive and modulated about a mean positive value or all negative and modulated about a mean negative value. In another type of PAM system known as the plus and minus pulse amplitude modulation system and referred to by the symbols ± PAM, the pulses generated will be positive and negative depending upon the amplitude and polarity of the modulating signal. In this last system, when the modulating voltage is zero, no pulse is generated for the channel circuit.

Fig. 1*a* shows the amplitude modulated pulses for one channel in a PAM system producing solely negative pulses. The dotted line curve represents the modulating signal. It will be noted that these pulses never reach zero value. The dash-dot horizontal line indicates the amplitude of the negative pulses in the absence of the modulating signal.

Fig. 1*b* shows the pulse wave form for a ± PAM system for one channel. It will be noted that the pulses of Fig. 1*b* are positive and negative with respect to zero for portions of different polarity of the modulating signal. The polarity of the pulses thus depends upon the polarity of the modulating signal. This type of pulse modulation system is well suited for time division multiplex systems to be used in conjunction with frequency modulated transmitters of the type described in copending application Serial No. 577,791, filed February 14, 1945, by C. W. Hansell.

In time division multiplex systems, the space between the pulses of Figs. 1*a* and 1*b* is occupied by the pulses from other channel units in the system.

It is much easier and less complicated to generate single polarity PAM pulses in simple channel units than the ± PAM pulses, and for this reason it is desirable to provide a system which will change all the pulses generated by a single polarity PAM system to ± PAM pulses. The system of the present invention accomplishes this result.

A more detailed description of the invention follows wherein;

Figs. 1*a* and 1*b* are curves graphically showing the types of pulses produced in single polarity PAM and plus-minus (±) PAM systems respectively;

Figs. 2*a*, 2*b* and 2*c* are pulse wave forms given in explanation of the operation of the system of the invention;

Figure 6:
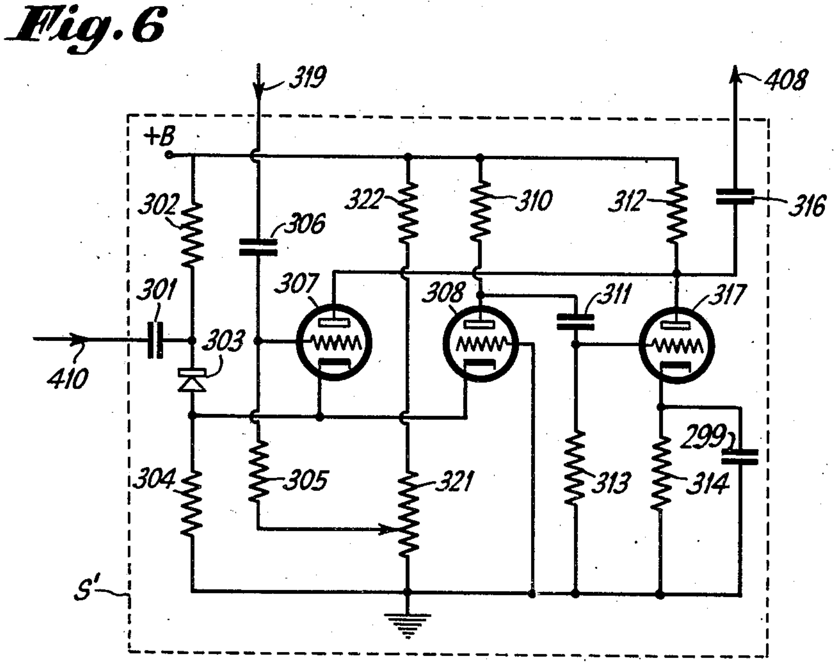
Figure 7:
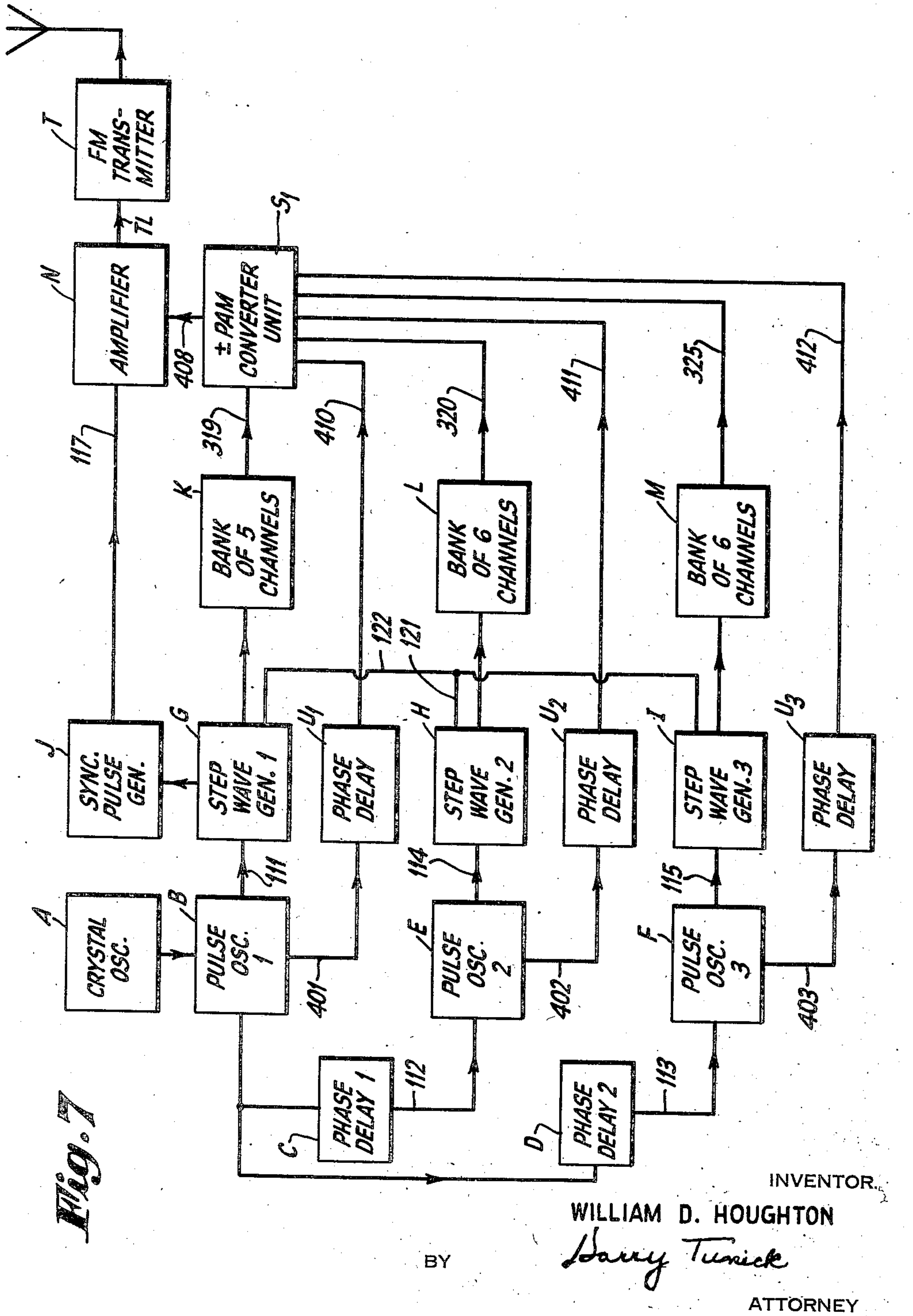
Figure 8:
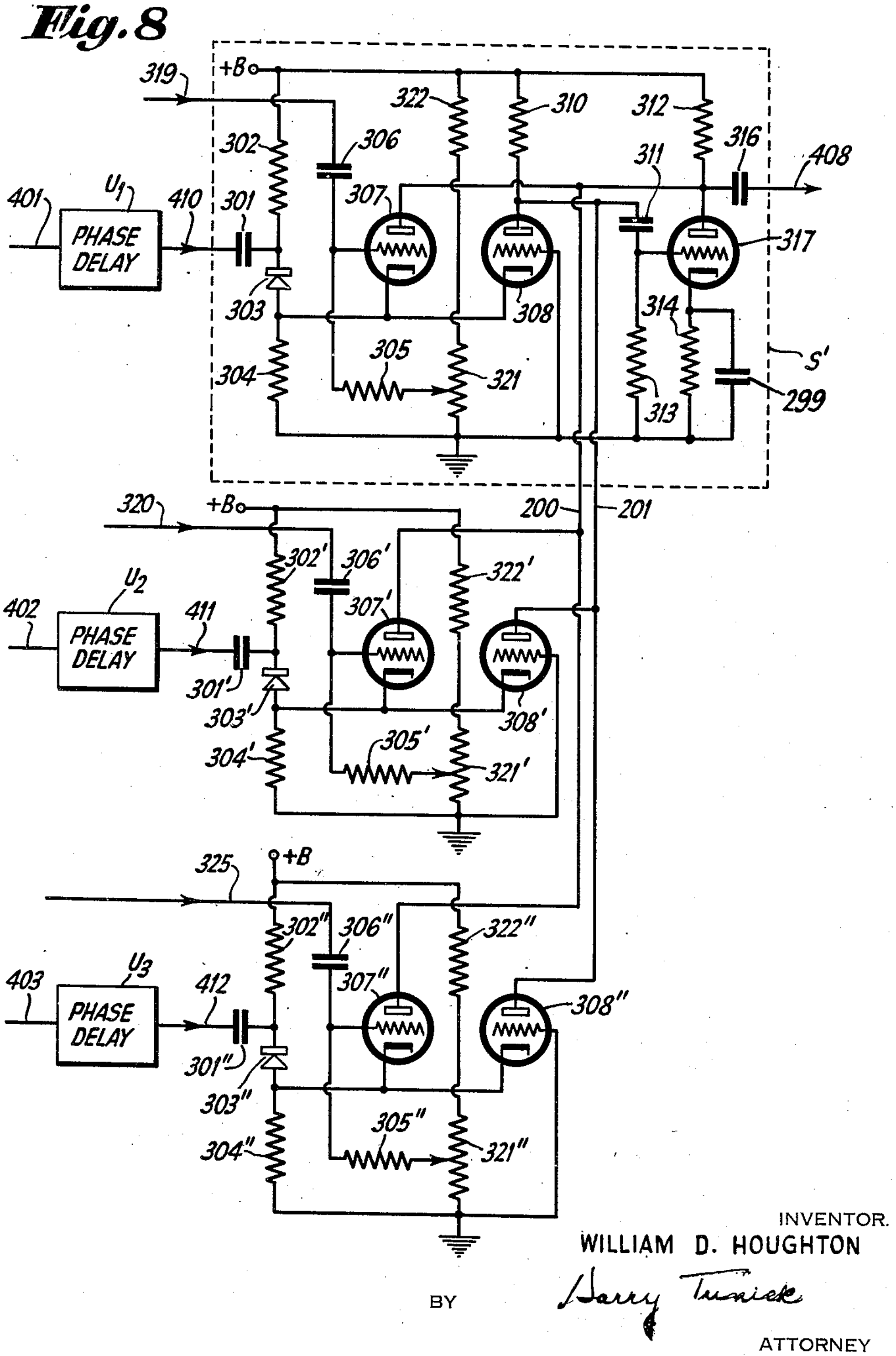

Fig. 6 schematically illustrates the circuit details of a modification of the converter unit of the invention;

Fig. 7 diagrammatically illustrates, in box form, a time division multiplex system of the invention using interlaced step voltage waves; and Fig. 8 schematically illustrates the circuit details of the converter unit of Fig. 7.

Figure 9:
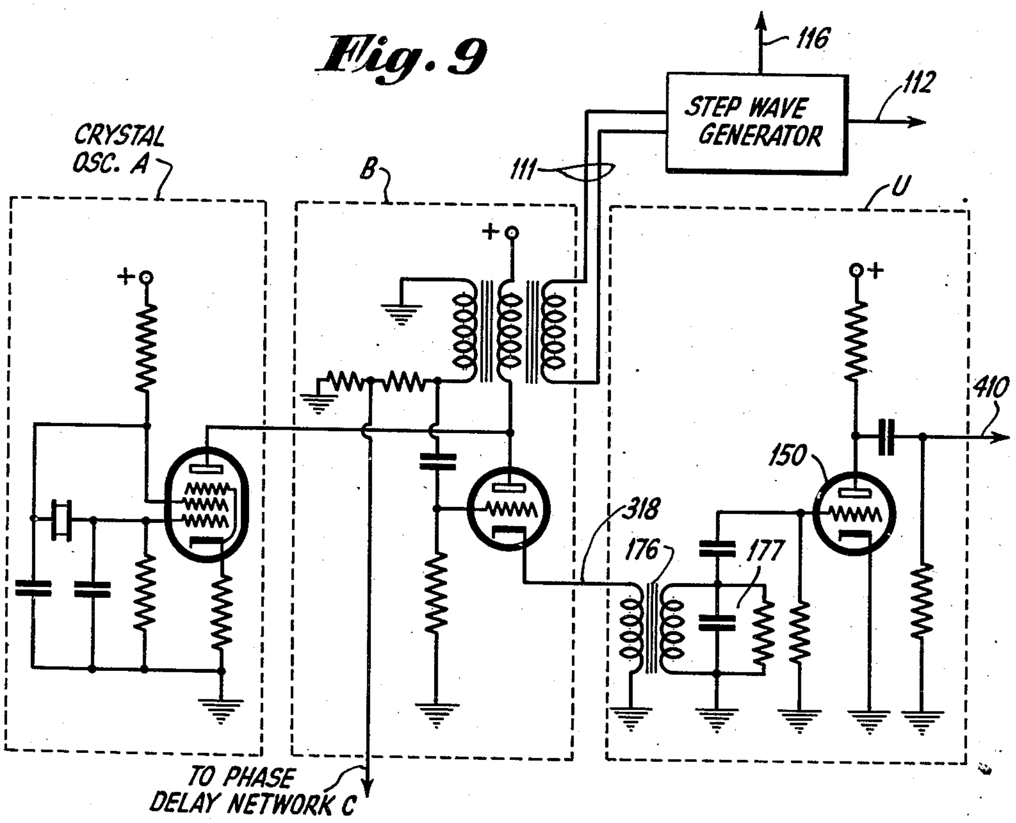
Figure 10:
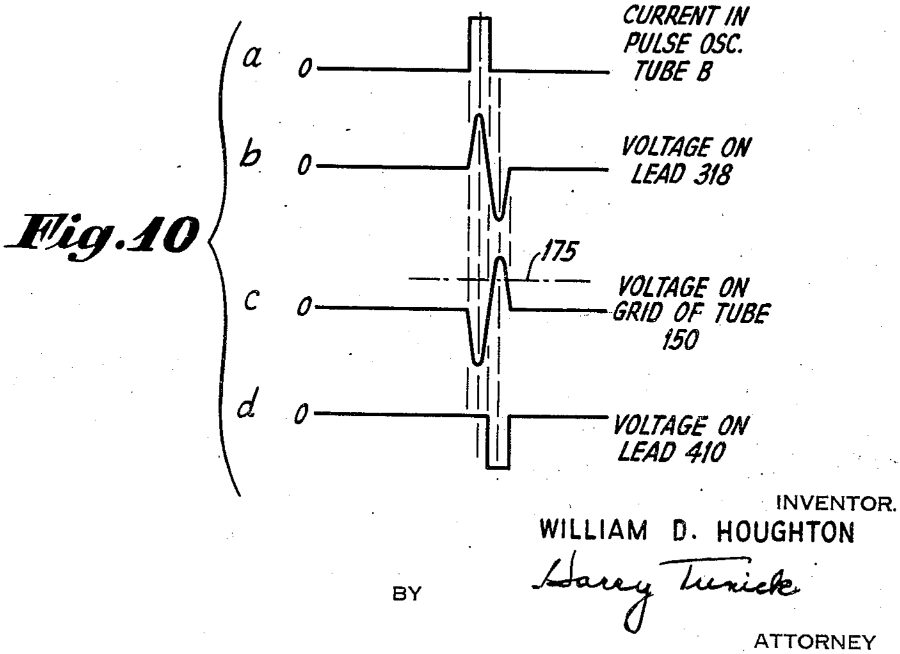

Fig. 9 shows a preferred arrangement of crystal oscillator A, pulse generator B and phase delay network U which can be used in practicing the present invention; and Fig. 10 is a series of curves given in explanation of the operation of Fig. 9.

Throughout the figures of the drawing the same parts are represented by the same reference numerals.

Figure 4:
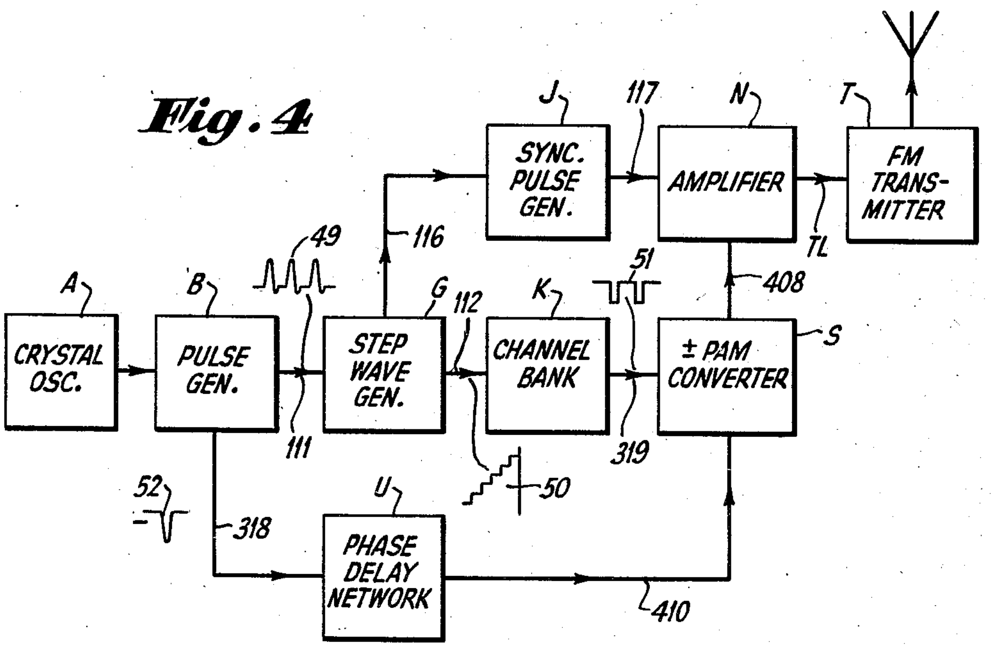
Fig. 4 illustrates diagrammatically, in box form, the invention as applied to the transmitting end of a multiplex time division communication system.

Referring to Fig. 4, there is shown a transmitting terminal comprising a crystal-controlled oscillator A whose constant frequency output locks-in or entrains the puse oscillator B. Pulse oscillator B may be of the blocking oscillator type and has a free running frequency slightly lower than the frequency of oscillator A. Pulse oscillator B feeds the step voltage wave generator G over lead 111 with short positive polarity pulses indicated by waveform 49. Generator G produces in lead 112 a step wave voltage indicated by waveform 50, which is used to control a group or bank of channels K. The function of the step wave voltage 50 is to time the occurrence of the pulses obtained from the different channels in K. Another output from the step wave generator G is a pulse occurring once for each step wave cycle and this pulse is applied to the synchronizing pulse generator J over lead 116. The pulse in lead 116 from the step wave generator G occurs on the termination or discharge of the step voltage wave produced by generator G. For a more detailed description of the crystal oscillator A, the pulse oscillator B and the step wave generator G, reference is made to the description of my copending application Serial No. 608,957, filed August 4, 1945, now Patent No. 2,531,817, granted November 28, 1950, with the exception that a negative pulse is obtained from the anode for use in the phase delay network, as will be explained later. Each channel in the group or bank K includes a channel or position selector and a pulse amplitude modulator. The channel selectors of the group or bank of channels K are fed in parallel over lead 112, and the channel selectors in the different channels are differently biased to become effective or conductive on different risers in the applied step voltage wave 50 on lead 112. Each channel has its own modulating signal and produces a negative going amplitude modulated pulse. The individual channel circuit in the group K may take the form illustrated and described in my copending application Serial No. 743,119, filed April 22, 1947. It will thus be seen that on the first riser of the step voltage wave 50, channel 1 of group K produces a pulse, while on the second riser of the step voltage wave 50 channel 2 of group K produces a pulse, and on the third riser channel 3 produces a pulse, etc., and these pulses from the different channels in bank K are phase or time displaced and do not overlap.

The amplitude of the pulses produced by the individual channel circuits in bank K is a function of the instantaneous amplitude of the audio modulating signal for that channel at the particular time of occurrence of the step riser allotted to that channel. The pulses produced in each channel have a repetition rate equal to the frequency of the step voltage wave 50, and this rate is usually chosen to be 2½ to 3 times the highest audio modulating frequency for that channel.

The negative going amplitude modulated pulses developed in the different channels of bank K and indicated by waveform 51 are sequentially passed on to the ± PAM converter S over lead 319. Negative going unmodulated pulses from pulse oscillator B, indicated by waveform 52, are fed to lead 318 which is connected to phase delay network U. The delayed negative output pulses from delay network U appear on lead 410 which also connects with the converter S. The phase delay network U may be an artificial line and its elements are so chosen that the delay therethrough is sufficient to permit the negative channel pulse supplied to converter S to reach its maximum negative value before the pulse from the delay network reaches the converter. The negative channel pulses applied to lead 319 are of longer duration than the negative delayed pulses applied to lead 410 for reasons which will appear later.

Figure 3:
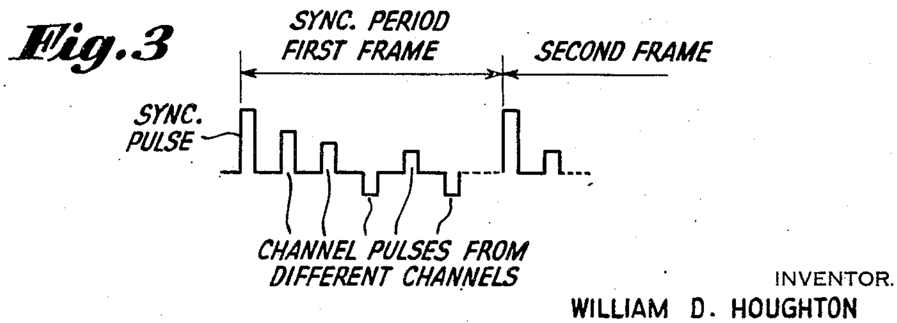
Fig. 3 shows a frame of pulses produced in the output of the multiplex time division system of the invention, in which the pulses for each frame or cycle of operations occur during a single synchronizing period.

The converter unit S converts the negative going amplitude modulated pulses received over lead 319 from bank K to plus and minus amplitude modulated pulses and feeds these last pulses to a common pulse amplifier N. The relatively larger amplitude synchronizing pulses from synchronizing pulse generator J are fed to amplifier N over lead 117. Pulse amplifier N combines the ± PAM pulses received from converter S and the synchronizing pulses received from J and feeds the combined train of pulses to the frequency modulation radio transmitter T over line TL. The pulse train fed to the transmitter T for each frame or cycle of operations (corresponding to a synchronizing period) for modulating the frequency of the radio transmitter T may look like the pulses of Fig. 3. It should be noted that the synchronizing pulse has an amplitude larger than the average maximum amplitude of the channel pulses, and that the pulses from the different channels occur sequentially in non-overlapping time intervals. Stated otherwise, each frame or cycle of operations as seen in the output of the common amplifier N, includes a large synchronizing pulse and a plurality of amplitude modulated pulses from the different channels in bank K. In practice, the amplitude of the synchronizing pulse may equal the maximum amplitude of a channel pulse under extremes of modulation, but will preferably have a longer duration than the channel pulse.

Figure 1A:
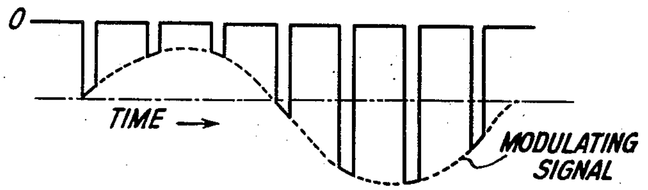
Figure 1B:
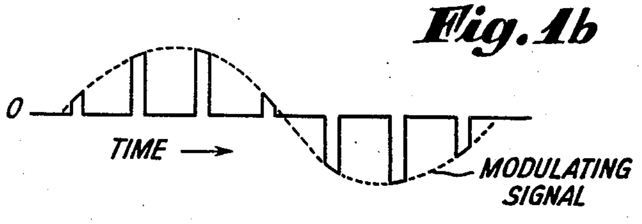

As previously mentioned, Fig. 1*a* shows the amplitude modulated pulses for one channel as they appear over an audio modulating cycle in lead 319. Fig. 1*b* shows the ± pulses for one channel over an audio modulating cycle as they appear on line TL. It should be understood that the pulses from the other channels occupy the time intervals between successive pulses in Figs. 1*a* and 1*b*.

Figure 5:
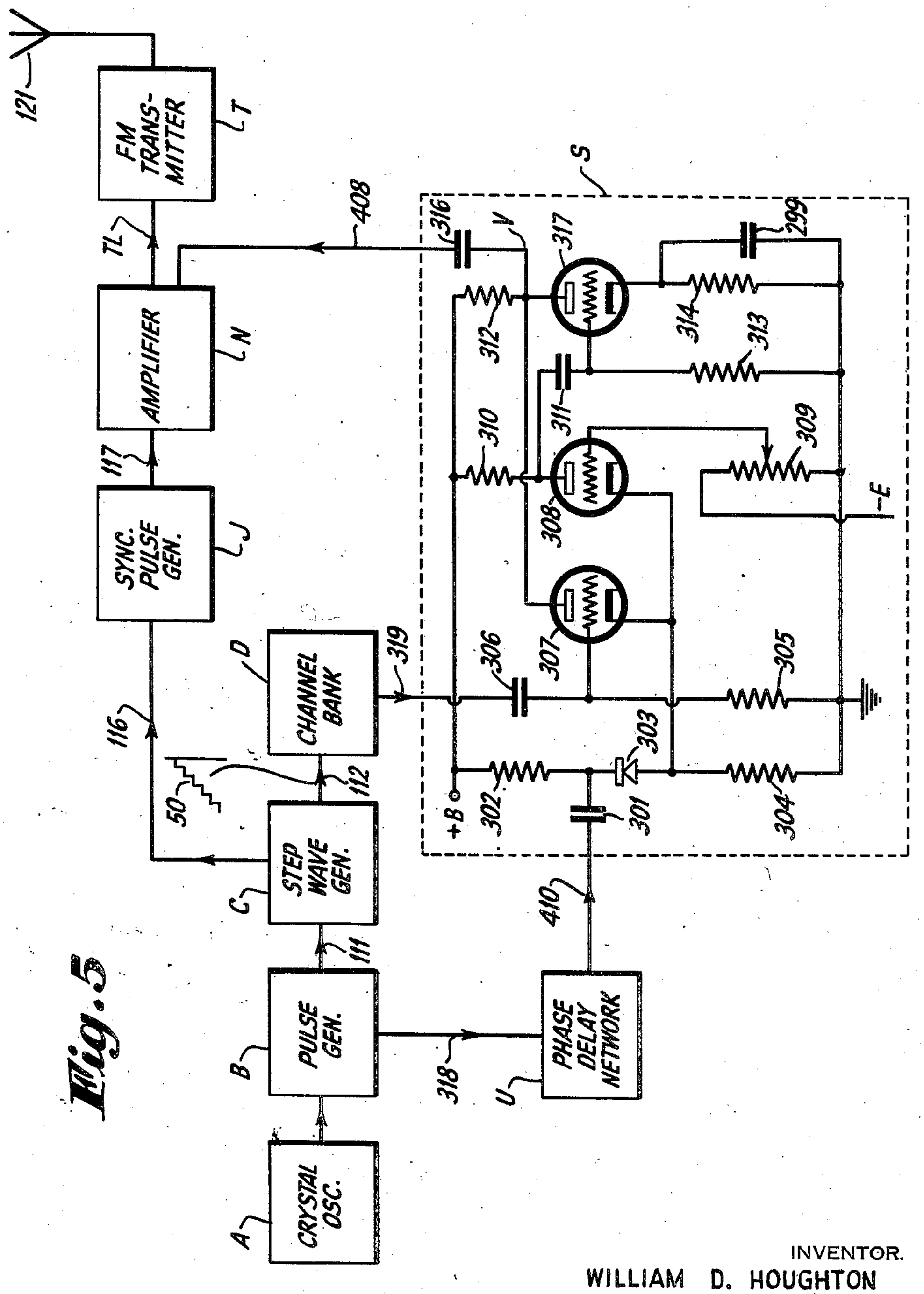
Fig. 5 illustrates the system of Fig. 4, partly diagrammatic and partly schematic, with the converter unit shown in detail.

Fig. 5 shows the system of Fig. 4 with the circuit details of the ± PAM converter unit S. This converter includes a pair of normally non-conducting triode vacuum tubes 307 and 308 whose cathodes are directly connected together and connected to a common cathode resistor 304. The anode of tube 308 is connected to the positive terminal +B of a source of unidirectional anode polarizing potential through a resistor 310. It is preferred that tubes 307 and 308 have identical operating characteristics. The anode of tube 307 is connected to the same anode polarizing terminal +B through a resistor 312 which is also common to the anode of a normally conducting amplifier tube 317. The anode of tube 308 is also coupled to the grid of amplifier tube 317 through coupling condenser 311.

The grid of tube 307 is fed with the negative channel pulses from bank K over lead 319 and coupling condenser 306. The grid of tube 308 is biased negatively by means of a tap on potentiometer 309 one of whose terminals is maintained at a negative potential by means of D. C. source —E.

Tubes 307 and 308 are normally non-conducting by virtue of the bias developed across the common cathode resistor due to the flow of current over a path traced from +B, resistor 302, rectifier 303 and resistor 304 to ground. Rectifier 303 is properly poled to achieve this result. The junction point between the rectifier 303 (which may be a diode) and resistor 302 is connected to a coupling condenser 301, in turn, connected to lead 410 to which are supplied the delayed negative pulses from the phase delay network U. These delayed negative pulses from the phase delay network may be referred to as gating pulses.

Amplifier 317 has its anode connected via coupling condenser 316 and lead 408 to the common amplifier N for supplying this amplifier with ± PAM output pulses. The cathode of amplifier 317 is provided with a cathode resistor 314 which may be variable. A resistor 313 connects the grid of amplifier tube 317 to ground.

The operation of this circuit is as follows. A pulse from B produces a riser in the step wave voltage generated by step wave generator G. Each riser causes a particular channel in the bank or group of channels K to produce a negative pulse which is coupled to the grid of normally non-conducting vacuum tube 307. At the time when pulse oscillator B produces a positive pulse on line 111, a negative pulse is produced on line 318. This pulse is delayed by delay network U for a period of time sufficient to permit the negative going pulse from the channel unit to reach its maximum negative value. The negative going pulses from delay network U cause normally conducting rectifier 303 to cut-off. It will be recalled that, normally, the current through diode 303 and flowing through resistors 302 and 304 develops sufficient voltage across resistor 304 to bias tubes 307 and 308 to cut-off. When the negative pulse from delay network U causes diode 303 to cut-off, the voltage across resistor 304 drops to a value which allows tubes 307 and 308 to become conducting. These tubes are then biased as class A amplifiers with resistor 304 as their common cathode resistor. With unmodulated pulses on the grid of tube 307, potentiometer 309 is adjusted to a value such that tubes 307 and 308 carry equal currents. Hence the negative going pulse developed across resistor 310 when current flows in tube 308 is equal to the pulse developed across resistor 312 due to current flowing in tube 307. When the negative channel pulses on the grid of tube 307 are modulated, the pulses developed across resistor 312 due to current in tube 307 vary positive (+) and negative (—) about the mean value of the pulse in resistor 310 (there is some modulation of the pulses across resistor 310 due to the cathode coupling between tubes 307 and 308 but this is small).

The negative going pulses developed across resistor 310 are coupled to normally conducting vacuum tube 317 by coupling condenser 311. These pulses cause tube 317 to cease conducting. The resistor 314 in the cathode of tube 317, bypassed by condenser 299, is so chosen that the decrease in current in tube 317 exactly balances the increase in current in tube 307 when it becomes conducting with unmodulated pulses on its grid. The result is that no change occurs in the voltage across resistor 312 when tube 307 becomes conducting since tube 317 was made to cease conducting at this time. If the pulses on the grid of tube 307 are varied in amplitude, then the increase in current in tube 307 will not exactly balance the decrease in current in 317 as a result of which there will be developed across resistor 312 a pulse whose polarity is either positive (+) or negative (—), and this last pulse is coupled to lead 408 by condenser 316.

The action of this circuit with time then is as follows. Pulse oscillator B produces a pulse which produces a riser in the step voltage wave from step wave generator G, and this riser causes one channel in the bank K to become conducting, producing a negative going pulse on lead 319 which is applied to tube 307 by coupling condenser 306. Since tube 307 is normally cut-off, nothing now happens. At the same time that pulse generator B produces a positive pulse on lead 111, a negative pulse is also produced on lead 318. After the pulse applied to the grid of tube 307 has reached its maximum negative value, the pulse from delay circuit U emerges on lead 410 and causes rectifier 303 to cease conducting by making its anode voltage more negative than its cathode. This action reduces the IR drop across resistor 304 and allows tubes 307 and 308 to become conducting. The negative voltage developed across resistor 310 by virtue of current flowing in tube 308 causes normally conducting tube 317 to cease conducting during the time tube 307 carries current. If the negative pulse on the grid of tube 307 has an amplitude equal to the negative D.-C. bias voltage on the grid of tube 308 produced by the adjustment of the tap on potentiometer 309, then the increase in current in tube 307 is exactly balanced by the decrease in current in tube 317 resulting in no change in voltage at point V. If, however, the peak negative voltage on the grid of tube 307 is more negative than the D. C. bias on the grid of tube 308, the increase in current in tube 307 will be less than the decrease in current in tube 317, resulting in a positive potential pulse at point V. Stated otherwise, if the rise in voltage in anode resistor 312 due to the cessation of current through tube 317 is greater than the fall in voltage in the same anode resistor due to the IR drop caused by the flow of current through tube 307, the net result will be a rise in voltage or a positive pulse on the anode of tube 317. By similar reasoning, if the potential on the grid of tube 307 is more positive than the D.-C. bias voltage on the grid of tube 308, a negative pulse will be developed at point V. After a period of time equal to the length of the pulse on line 318, that is, when the pulse across rectifier 303 ceases, rectifier 303 again conducts and causes tubes 307 and 308 to cut-off, which also causes tube 317 to return to its normal conducting condition. The negative going pulse applied to the grid of tube 307 via lead 319 ceases a short time after tubes 307 and 308 are cut-off. But since tube 307 is cut-off when the pulse on its grid ceases, nothing now happens.

Figures 2A, 2B, 2C:
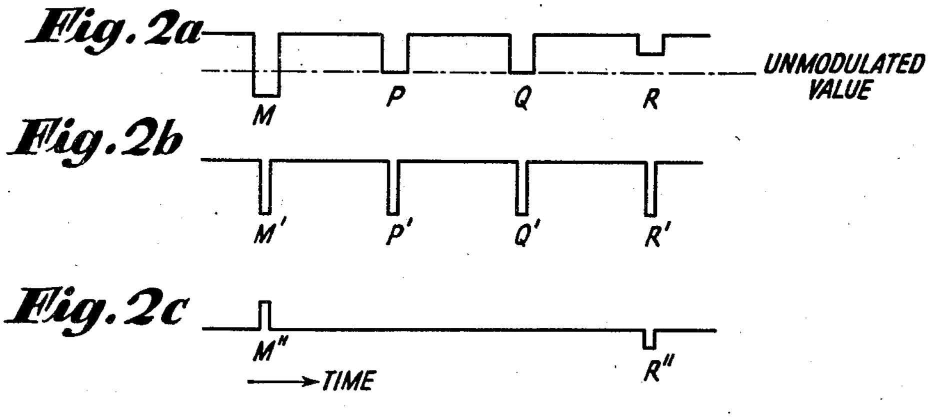

Fig. 2a indicates the possible appearance of the negative going channel pulses on lead 319. These pulses have been designated M, P, Q and R. The horizontal dash-dot line in Fig. 2a represents the unmodulated value of the pulses. Fig. 2b represents the delayed negative going pulses on lead 410 which are designated M', P', Q' and R'. It should be noted that the pulses in Fig. 2b are narrower than those of Fig. 2a. Fig. 2c indicates the resultant ± pulses designated M'' and R'' which appear on lead 408 in the output of converter S. It should be noted that there are no pulses in Fig. 2c at the time intervals corresponding to the unmodulated P and Q pulses of Fig. 2a, and that the first pulse in Fig. 2c is positive while the last pulse in Fig. 2c is negative.

At the risk of redundancy, but in the interest of clarity, this may be explained in the following manner: Let it be assumed that the unmodulated value of the channel pulses in lead 319 (Fig. 2a) is 2 volts and that the bias on tube 308 has been set at −2 volts by means of potentiometer 309.

The pulses P and Q from the channel bank K cause the grid of tube 307 to be lowered −2 v. The bias on tube 308 has previously been set at −2 v. by means of potentiometer 309. A short time later at the center of the pulse across resistor 305, phase delay network U produces a pulse which appears on lead 410, which allows tubes 307 and 308 to become conducting by cutting off diode 303. After this pulse is over, tubes 307 and 308 again cut-off, and at a short time later the negative going pulse across resistor 305 is removed. The current flow in tubes 307 and 308 in this case are equal during the pulse time. Since tube 317 is a unity gain amplifier, its change in current is equal and opposite to the change in current in tube 308 and therefore also equal and opposite to the current in tube 307. Hence the amount of current increase due to tube 307 becoming conducting is cancelled by the decrease of current in tube 317. (Note absence of pulses in Fig. 2c at positions corresponding to time invervals of pulses P and Q.) In the case where modulation is present and the amplitude of the pulse across resistor 305 is, for example, −3 v. negative, as shown in pulse M, Fig. 2a, tube 307 carries less current than does tube 308 when these tubes are made conducting by means of pulses from the phase delay network U. Hence the increase in current in tube 307 is less than the decrease in current in tube 317, resulting in a positive pulse being developed across resistor 312, as shown in pulse M'', Fig. 2c. If the pulses on tube 307 were less than −2 v., then tube 307 would carry more current than tube 308 and, therefore, the increase in current in tube 307 would be greater than the decrease in current in tube 317, resulting in a negative pulse being developed across resistor 312 as indicated by R'' in Fig. 2c.

In Fig. 6 is shown schematically an alternative circuit for the converter unit S' similar to that included in the dashed box S in Fig. 5. All components performing similar functions are given the same designations. The only difference between the converter unit S in Fig. 5 and S' in Fig. 6 is that instead of applying a negative D.-C. voltage on the grid of tube 308, a positive D.-C. voltage is applied to the grid of tube 307 by means of resistor 305 and potentiometer 321 and this positive D.-C. voltage is exactly equal to the negative pulse amplitude present when the channels are producing unmodulated pulses. That is, the potentials on the grids of tubes 307 and 308 are equal to zero when these tubes are made conducting due to the pulse on lead 410 when the particular channel pulse is unmodulated. The potential on the grid of tube 307 is varied plus and minus about zero in accordance with the modulation applied to the channel. Otherwise the circuit of Fig. 6 operates in a manner identical to that described for Fig. 5.

In Fig. 7 is shown a block diagram of a time division multiplex system using interlaced step waves similar to that described in my copending application Serial No. 737,901, filed March 28, 1947, now Patent No. 2,543,737, granted February 27, 1951.

In this case crystal oscillator A drives pulse oscillator B. Positive pulses from B are coupled to step wave generator G via lead 111. Step wave generator G drives a bank of channels K. Each channel in K may be similar to that described in my copending application Serial No. 743,119, filed April 22, 1947. A positive pulse from B is also coupled to delay networks C and D, while simultaneously a negative pulse is coupled to delay network $U_1$ over lead 401. The pulse from B causes a riser to occur in the step wave output of G, which in turn causes one channel in bank K to produce a negative going amplitude modulated pulse which is coupled to converter unit $S_1$ over lead 319. A short time later, a pulse is produced on lead 410 by delay network $U_1$. This pulse causes converter unit $S_1$ to produce either a positive or negative pulse, depending upon the polarity of the modulating voltage applied to the channel at the time of the pulse from $U_1$. (If the modulating voltage is zero no pulse will be produced as previously explained.) After a period of time equal to ⅓ the period of pulse oscillator B, a pulse is produced in oscillator E which causes step wave generator H to produce a riser which causes one channel in bank L to become operative and produce a negative pulse on line 320. The amplitude of this negative pulse is a function of the modulating voltage applied to the channel at the time of the step riser. At the same time pulse oscillator E produces a positive pulse on lead 114, a negative pulse is produced on lead 402. A short time later (short compared to the period of B) the pulse emerges from delay network $U_2$ on lead 411 and makes converter circuit $S_1$ operative as previously described.

At a period of time equal to ⅔ the period of pulse oscillator B, after B fires, a pulse emerges from delay network D on lead 113 and causes pulse oscillator F to fire, simultaneously producing a positive pulse on lead 115 and a negative pulse on 403. The positive pulse on lead 115 produces a riser in the step voltage wave output from step wave generator I which makes one channel in the bank M operative, after which a negative pulse emerges on lead 412 from delay circuit $U_3$. This pulse causes the converter circuit $S_1$ to become operative as previously described.

In Fig. 8 is shown the circuits contained in converter unit $S_1$ of Fig. 7. The dash-dot box S' in Fig. 8 contains a circuit identical to that shown in Fig. 6, the operation of which was previously described. The circuit elements in Fig. 8 which are identified by prime and double prime numbers are identical to the circuits bearing similar numbers in the dash-dot box. The anodes of tubes 307' and 307'' are directly connected together by connection 200, while the anodes of tubes 308', 308'' are directly connected together by lead 201. It will be seen that only one tube 317 is required to balance the three tubes 307, 307' and 307''.

Normally, non-conducting tubes 307 and 308 carry current when the pulse emerges from delay line $U_1$ at which time 317 ceases conducting. After the pulse from $U_1$ ceases, tubes 307 and 308 then cease conducting and tube 317 again conducts. After a period of time equal to ⅓ the period of B, after the pulse emerges from delay circuit $U_1$, a pulse emerges from delay circuit $U_2$ causing tubes 307' and 308' to conduct and again causing the common tube 317 to cease conducting.

After the end of the pulse from $U_2$, tubes 307' and 308' are cut-off and tube 317 again conducts.

After a period of time equal to ⅓ the period of pulse oscillator B after the pulse emerges from phase delay circuit $U_2$, a pulse emerges from phase delay circuit $U_3$, causing tubes 307'' and 308'' to carry current, thus again causing tube 317 to cut-off. After the pulse from $U_3$ ceases, tubes 307'' and 308'' are cut-off and tube 317 again conducts. After a period of time equal to ⅓ the period of pulse oscillator B, after the pulse emerges from delay circuit $U_3$, another pulse emerges from phase delay circuit $U_1$ causing 307 and 308 to again conduct. This operation continues until all channels have produced their pulses, at which time a new frame or channeling cycle starts.

The system of the invention is especially suited for interlaced step voltage wave type distributor arrangements since each channel in a bank may be allowed a time interval slightly shorter than the period of the master pulse oscillator B, Fig. 7. The pulse from one channel may be present on one tube 307, Fig. 8, at the same time that pulses from two other channels are present on tubes 307' and 307'' of Fig. 8. Since the tubes are only conducting one at a time sequentially, no cross talk is present in the common load resistor 312. All that is required then is that the grid of tube 307 be clear of a pulse before the next channel pulse arrives on its grid. This allows a time equal to the period of pulse oscillator B between successive pulses in any one channel bank while the time between successive pulses on resistor 312 (Fig. 8) is equal to ⅓ the period of pulse oscillator B. An interlaced step voltage wave distributor system is described in my copending application Serial No. 737,901, filed March 28, 1947.

This feature enables the pulse from the individual channels to have a considerable variation in width, thus eliminating the necessity of additional adjustments to insure proper pulse duration from each channel in a multi-channel system of 30 channels and more without producing excessive cross talk between channels.

Fig. 9 shows a preferred arrangement of crystal oscillator A, pulse generator B and phase delay network U which may be used in Fig. 7, and also used in Figs. 4 and 5 by omitting the connection to the phase delay network C. The operation of the crystal oscillator A and the pulse generator B will be obvious from reference to my copending application Serial No. 608,957 supra. The phase delay network U includes a vacuum tube 150 which is normally non-conductive and is supplied with a positive pulse on its grid of a magnitude sufficient to overcome the cut-off bias and cause it to conduct at a desired time after the pulse oscillator B fires. The output from the anode of the delay network tube 150 is a negative pulse.

Fig. 10 graphically illustrates the operation of the arrangement of Fig. 9. Curve *a* represents the pulse of current in the pulse oscillator B when it conducts. Curve *b* indicates the voltage developed in lead 318 due to the current pulse of curve *a*. Curve *c* represents the voltage applied to the grid of tube 150 of the phase delay network U. The horizontal dash-dot line 175 in curve *c* represents the point above which tube 150 conducts. The position of the peak positive portion above the line 175 in curve *c* is determined by the value of condenser 177 across the secondary winding of differentiating transformer 176 in delay network U. Curve *d* represent the output voltage pulse from network U appearing on lead 410. It should be noted that this pulse in curve *d* is delayed with respect to the current pulse in curve *a*.

By the use of the system of the invention it is possible to make the individual channel units exceedingly simple. They require but one twin triode per channel with a maximum of two adjustments to properly position and balance each channel.

In one experimental model of a 30 channel system successfully tried out, the master pulse oscillator frequency was 90 kc., permitting 11.1 microsecond spacing between adjacent channel pulses in any one group. The channel pulses were made approximately 3 microseconds in duration. This allowed a spacing of 8 microseconds between adjacent edges of adjacent channel pulses in the separate banks. (The pulses varied in duraion from 3 to 4 microseconds.) The pulses fed to the converter circuits from delay networks $U_1$, $U_2$ and $U_3$, Fig. 7, were 1 microsecond in duration. The delay times of $U_1$, $U_2$ and $U_3$ were made 1.5 microseconds. The pulses finally coupled to the R.-F. transmitter T were 1 microsecond in duration with a mean spacing (center to center) of 3.7 microseconds.

The term "ground" used herein and in the appended claims is not limited to an actual earthed connection, and is deemed to include a point of reference potential.

What is claimed is:

1. In a pulse generating system, a pair of first and second vacuum tubes each having a cathode, a control electrode and an anode, individual resistors connecting said anodes to the positive terminal of a source of anode polarizing potential, a direct connection between said cathodes, a common cathode resistor connected between said cathodes and ground, a rectifier connected between said cathodes and said positive terminal and being so poled as to allow current flow through said cathode resistor, to thereby bias said tubes to the anode current cut-off condition, a third vacuum tube having an anode and a grid, a connection from the anode of said third tube to said positive terminal through the anode resistor of said first tube, a circuit coupling the anode of said second tube to the grid of said third tube, means biasing said third tube to pass current normally, in the absence of current flow through said second tube, a source of fixed amplitude pulses of negative polarity coupled to said rectifier for causing the cessation of current flow through said rectifier during the occurrence of said pulses and the consequent flow of current through said first and second tubes, a source of amplitude modulated pulses of negative polarity coupled to the control electrode of said first tube, an adjustable element in circuit with one of said pair of tubes for equalizing the current flow through said first and second tubes in the absence of modulation on said last pulses, and an output circuit coupled to the anode of said third tube.

2. In a pulse generating system a pair of first and second vacuum tubes each having a cathode, a control electrode and an anode, individual resistors connecting said anodes to the positive terminal of a source of anode polarizing potential, a direct connection between said cathodes, a common cathode resistor connected between said cathodes and ground, a rectifier connected between said cathodes and said positive terminal and being so poled as to allow current flow through said cathode resistor, to thereby bias said tubes to the anode current cut-off condition, a third vacuum tube having an anode and a grid, a connection from the anode of said third tube to said positive terminal through the anode resistor of said first tube, a circuit coupling the anode of said second tube to the grid of said third tube, means biasing said third tube to pass current normally, in the absence of current flow through said second tube, a source of fixed amplitude pulses of negative polarity coupled to said rectifier for causing the cessation of current flow through said rectifier during the occurrence of said pulses and the consequent flow of current through said first and second tubes, a source of amplitude modulated pulses of negative polarity coupled to the control electrode of said first tube, and adjustable bias element in circuit with the control electrode of said second tube for equalizing the current flow through said first and second tubes in the absence of modulation on said last pulses, and an output circuit coupled to an electrode of said third tube.

3. In a pulse generating system, a pair of first and second vacuum tubes each having a cathode, a control electrode and an anode, individual resistors connecting said anodes to the positive terminal of a source of anode polarizing potential, a direct connection between said cathodes, a common cathode resistor connected between said cathodes and ground, a rectifier connected between said cathodes and said positive terminal and being so poled as to allow current flow through said cathode resistor, to thereby bias said tubes to the anode current cut-off condition, a third vacuum having an anode, a grid and a cathode, individual resistors connected between ground and said last grid and said last cathode, a direct connection between the anode of said third tube and the anode of said first tube, a condenser coupling the anode of said second tube to the grid of said third tube, said third tube comprising a normally conducting amplifier which is biased to cut-off when said second tube conducts, a source of fixed amplitude pulses of negative polarity coupled to said rectifier for causing the cessation of current flow through said rectifier during the occurrence of said pulses and the consequent flow of current through said first and second tubes, a source of amplitude modulated pulses of negative polarity coupled to the control electrode of said first tube, an adjustable bias element in circuit with the grid of said second tube so adjusted as to equalize the flow of current through said first and second tubes in the absence of modulation on said last pulses, and an output circuit coupled to said third tube.

4. A system in accordance with claim 1, characterized in this, that said fixed amplitude pulses have a duration less than the duration of the amplitude modulated pulses and occur at a time slightly after the starting edge of said amplitude modulated pulses.

5. A transmitter system comprising a pulse generator, a step wave generator coupled to said pulse generator, a delay circuit also coupled to said pulse generator, said step wave generator producing a step voltage wave having a plurality of steps or risers, a channel circuit having a selector coupled to said step wave generator and biased to become effective on a particular riser in the step voltage wave, means for producing a negative pulse in said channel circuit and for modulating the amplitude thereof, a connection for deriving a negative pulse from said delay circuit which concurs with the channel pulse, and an electron discharge device system coupled to said connection and to said channel circuit over separate paths and controlled by the negative pulses therefrom to produce output pulses of one polarity when the amplitude of said channel pulses exceed the unmodulated value and to produce output pulses of an opposite polarity when the amplitude of the channel pulses is less than the unmodulated value.

6. A system in accordance with claim 5, characterized in this, that said electron discharge device system includes a pair of normally nonconductive vacuum tubes and a normally conductive vacuum tube controlled by one of said pair of tubes, a direct connection between the anode of said normally conductive tube and the anode of one tube of said pair, a connection from the control grid of the other tube of said pair to said channel circuit, means coupled to said delay circuit and responsive to a pulse therefrom for causing current to flow in said pair of tubes, as a result of which current ceases to flow in said normally conductive tube, and an output circuit coupled to the anode of said normally conductive tube.

7. In a pulse generating system, a generator of primary pulses, means coupled to said generator for producing other pulses of a predetermined polarity and for modulating the amplitude thereof in accordance with message waves, means including a phase delay circuit also coupled to said generator for deriving phase delayed pulses of the same predetermined polarity and of a shorter duration than said amplitude modulated pulses, the phase delay being such that the phase delayed pulses and the amplitude modulated pulses occur simultaneously, and a double polarity pulse generating system, means feeding said double polarity pulse system with both the amplitude modulated pulses and the phase delayed pulses, said double polarity pulse generating system including electronic means so constructed and arranged as to produce output pulses of one polarity when said amplitude modulated pulses exceed a predetermined value and output pulses of an opposite polarity when said amplitude modulated pulses are less than said predetermined value.

8. In a multiplex system employing an interlaced step voltage wave distributor arrangement wherein there are produced a plurality of phase displaced step voltage waves, and wherein a plurality of differently biased channel circuits are made operative on different risers of each step voltage wave, each channel circuit having means therein for producing a pulse of one polarity and for modulating the amplitude thereof, a converter circuit coupled to the outputs of all channel circuits and having means for changing the single polarity amplitude-modulated channel pulses to amplitude modulated pulses whose amplitude and polarity depends upon the degree and phase of modulation on the channel pulses, and means for producing suitable phased gating pulses synchronized with said step voltage waves and coupled to said converter circuit for selectively causing output pulses from said converter circuit to occur sequentially in non-overlapping time relation regardless of possible overlap of the channel pulses applied to said converter.

9. In a pulse generating system, a pair of first and second vacuum tubes each having a cathode, a control electrode and an anode, individual resistors connecting said anodes to the positive terminal of a source of anode polarizing potential, a direct connection between said cathodes, a common cathode resistor connected between said cathodes and ground, a rectifier connected between said cathodes and said positive terminal and being so poled as to allow current flow through said cathode resistor, to thereby bias said tubes to the anode current cut-off condition, a third vacuum tube having an anode, and a grid, a connection from the anode of said third tube to said positive terminal through the anode resistor of said first tube, a circuit coupling the anode of said second tube to the grid of said third tube, means biasing said third tube to pass current normally, in the absence of current flow through said second tube, means for supplying pulses of negative polarity to said rectifier for causing the cessation of current flow through said rectifier during the occurrence of said pulses and the consequent flow of current through said first and second tubes, means for supplying pulses of negative polarity to the control electrode of said first tube, means in circuit with one of said pair of tubes for equalizing the current flow through said first and second tubes when said last pulses have a predetermined value, and an output circuit coupled to the anode of said third tube.

10. In a pulse generating system, a generator of primary pulses, means coupled to said generator for producing other pulses of a predetermined polarity and for modulating the amplitude thereof in accordance with message waves, means including a phase delay circuit also coupled to said generator for deriving phase delayed pulses of the same predetermined polarity and of a shorter duration than said amplitude modulated pulses, the phase delay being such that the phase delayed pulses and the amplitude modulated pulses occur simultaneously, and a double polarity pulse generating system, means feeding said double polarity pulse system with both the amplitude modulated pulses and the phase delayed pulses, said double polarity pulse generating system including electronic means so constructed and arranged as to produce output pulses of one polarity when said amplitude modulated pulses exceed a predetermined value and output pulses of an opposite polarity when said amplitude modulated pulses are less than said predetermined value, said electronic means including a normally non-conductive discharge device which becomes conductive when supplied with a phase delayed pulse and whose degree of conductivity is dependent upon the magnitude of the amplitude modulated pulse supplied thereto concurrently with the phase delayed pulse, and a normally conductive discharge device having a common load with said first device and whose conductivity is reduced when said first device becomes conductive, said normally conductive device furnishing the output pulses from said double polarity pulse generating system.

11. In a multiplex system employing an interlaced voltage wave distributor arrangement wherein there are produced a plurality of phase displaced voltage waves, and wherein a plurality of differently biased channel circuits are made operative on different portions of each voltage wave, each channel circuit having means therein for producing a pulse of one polarity and for modulating the amplitude thereof, a converter circuit coupled to the outputs of all channel circuits and having means for changing the single polarity amplitude-modulated channel pulses to amplitude modulated pulses whose amplitude and polarity depends upon the degree of modulation on the channel pulses, and means for producing suitable phased gating pulses synchronized with said voltage waves and coupled to said converter circuit for selectively causing output pulses from said converter circuit to occur sequentially in non-overlapping time relation regardless of possible overlap of the channel pulses applied to said converter.

12. In a pulse generating system, a pair of first and second vacuum tubes each having a cathode, a control electrode and an anode, individual impedances connecting said anodes to the positive terminal of a source of anode polarizing potential, a direct connection between said cathodes, a common cathode impedance connected between said cathodes and a point of reference potential, a rectifier connected between said cathodes and said positive terminal and being so poled as to allow current flow through said cathode resistor, to thereby bias said tubes to the anode current cut-off condition, a third vacuum tube having an anode, and a grid, a connection from the anode of said third tube to said positive terminal through the anode impedance of said first tube, a circuit coupling the anode of said second tube to the grid of said third tube, means biasing said third tube to pass current normally, in the absence of current flow through said second tube, means for supplying pulses of negative polarity to said rectifier for causing the cessation of current flow through said rectifier during the occurrence of said pulses and the consequent flow of current through said first and second tubes, means for supplying pulses of negative polarity and of longer duration than said first pulses to the control electrode of said first tube, means in circuit with one of said pair of tubes for equalizing the current flow through said first and second tubes when said last pulses have a predetermined value, and an output circuit coupled to the anode of said third tube.

13. In a multiplex system employing an interlaced step voltage wave distributor arrangement wherein there are produced a plurality of phase displaced step voltage waves, and wherein a plurality of differently biased channel circuits are made operative on different risers of each step voltage wave, each channel circuit having means therein for producing a pulse of one polarity and for modulating the amplitude thereof, a converter circuit coupled to the outputs of all channel circuits and having means for changing the single polarity amplitude-modulated channel pulses to amplitude modulated pulses whose amplitude and polarity depend upon the degree and phase of modulation on the channel pulses, and means for producing suitable phased gating pulses synchronized with and of shorter duration than said step voltage waves and coupled to said converter circuit for selectively causing output pulses from said converter circuit to occur sequentially in non-overlapping time relation regardless of possible overlap of the channel pulses applied to said converter.

14. In combination in a pulse system, a first vacuum tube electrode structure having an anode and a grid, a source of potential coupled to said anode through an impedance capable of passing direct current, a second vacuum tube electrode structure, a direct current connection between the anodes of said two structures, means for intermittently biasing said second structure to operate class A, means for applying modulation to said second structure concurrently with the application of said intermittent bias, means for applying a substantially constant bias to the grid of said first structure during the intervals that said second structure operates class A, and means for deriving output pulses from said first structure.

15. In combination in a pulse system, a first vacuum tube electrode structure having an anode, a cathode and a grid, a source of potential coupled to said anode through an impedance capable of passing direct current, a second vacuum tube electrode structure, a direct current connection between the anodes of said two structures, means for intermittently biasing said second structure to operate class A, means for applying modulation to said second structure solely during the application of said intermittent bias, means for applying a substantially constant bias to the grid of said first structure during the intervals that said second structure operates class A, and means for deriving output pulses from said first structure.

16. In combination in a pulse system, a first vacuum tube electrode structure having an anode and a grid, a source of potential coupled to said anode through a resistor, a second vacuum tube electrode structure having an anode directly connected to the anode of said first structure and also having a grid, a source of modulation coupled to the grid of said second structure, and means for applying a substantially constant bias to the grid of said first structure during the interval modulation is applied to said second structure.

17. In combination in a pulse system, a first vacuum tube electrode structure having an anode, a source of potential coupled to said anode through a resistor, means for normally biasing said tube to pass current, a second vacuum tube electrode structure having an anode directly connected to the anode of said first structure, means for intermittently applying modulation to said second structure, and means for applying a relatively negative bias to said first structure substantially registering with the time of application of the intermittent bias to the second structure.

18. In combination in a pulse system, a first vacuum tube multi-electrode structure having an anode, a source of potential coupled to said anode through an impedance capable of passing direct current, means coupled to said electrode structure for normally biasing said tube to pass current, a second vacuum tube multi-electrode structure having an anode, a direct current connection between the anodes of both said structures, means for applying modulation to an electrode of said second structure other than its anode, and means independent of said modulation for intermittently applying to an electrode of said first structure other than its anode a bias at times during which modulation is applied to the second structure.

19. In a pulse generating system, a pair of first and second vacuum tube electrode structures each having a cathode, a control electrode and an anode, individual resistors connecting said anodes to the positive terminal of a source of anode polarizing potential, a direct connection between said cathodes, a common cathode impedance connected between said cathodes and ground, a rectifier connected between said cathodes and said positive terminal and being so poled as to allow current flow through said cathode impedance to thereby bias said tubes to the anode current cut-off condition, a third vacuum electrode structure having an anode and a grid, a connection from the anode of said third structure to said positive terminal through the anode resistor of said first structure, a circuit coupling the anode of said second tube to the grid of said third tube, means biasing said third structure to pass current normally, in the absence of current flow through said second structure, means for applying pulses of negative polarity coupled to said rectifier for causing the cessation of current flow through said rectifier during the occurrence of said pulses and the consequent flow of current through said first and second structures, means for applying amplitude modulated pulses of negative polarity to the control electrode of said first structure, an adjustable element in circuit with one of said pair of electrode structures for equalizing the current flow through said first and second structures in the absence of modulation on said last pulses, and an output circuit coupled to the anode of said third electrode structure.

20. In a pulse generating system, means producing a first pulse of predetermined polarity, means producing a second pulse of the same polarity as said first pulse and at substantially the same time, means responsive to said second pulse for producing a flow of space current over a pair of paths, means in one of said paths responsive to said first pulse for controlling the amount of current in said one path, means in circuit with said other path for adjusting the flow of current in said other path to a value which equals the flow of current in said one path when said first pulse has a predetermined value, and means responsive to the difference in current flow over both of said paths for producing a pulse whose relative polarity depends upon whether the first pulse has an amplitude larger than or smaller than said predetermined value.

21. In a pulse system for converting single amplitude modulated polarity pulses to double polarity pulses, means for producing said single polarity amplitude modulated pulses, means for producing fixed amplitude pulses which occur simultaneously with said amplitude modulated pulses, means responsive to said fixed amplitude pulses for producing a flow of space current over a pair of paths, means in one of said paths responsive to said amplitude modulated pulses for controlling the amount of current in said one path, means for adjusting the relative amounts of current flow in both of said paths to be equal when said amplitude modulated pulses have a predetermined value, and means for comparing the current flow in both of said paths and for producing pulses of opposite relative polarities when said amplitude modulated pulses are on opposite sides of said predetermined value.

22. In a pulse generating system, a pair of electron tube structures each having an anode, a grid and a cathode, a direct current connection between the cathodes of both structures, means for applying a positive potential to said anodes relative to said cathodes, a circuit having therein an impedance coupled between said direct current connection and ground, a source of recurring control waves and a source of signal modulation, means for connecting one of said sources to said impedance and the other of said sources to one of said grids, means for maintaining said other grid at a predetermined unidirectional potential relative to ground, and an output circuit coupled to one of said anodes.

23. In a pulse generating system, a pair of electron tube structures each having an anode, a grid and a cathode, a direct current connection between the cathodes of both structures, means for applying a positive potential to said anodes relative to said cathodes, a circuit having therein an impedance coupled between said direct current connection and ground, a source of gating pulses of fixed amplitude and a source of amplitude modulated signals, said gating pulses and said signals having the same relative polarities, means for connecting one of said sources to said impedance and the other of said sources to one of said grids, means for maintaining said other grid at a predetermined unidirectional potential relative to ground, and an output circuit coupled to one of said anodes.

24. In combination in a pulse system, a first multi-electrode vacuum tube having an anode, a multi-electrode amplifier tube having an anode connected to the anode of the first tube over a path capable of passing direct current, a source of potential coupled to both of said anodes solely through a single path including a resistor, means for applying an amplitude modulated signal to an electrode of said second tube other than its anode, and means independent of said modulation for intermittently applying to an electrode of said first tube other than its anode a bias which reduces the flow of anode current therein when modulation is applied to the second tube.

25. In combination in a pulse system, a first multi-electrode vacuum tube having an anode and a grid, a second multi-electrode amplifier tube having an anode and other electrodes, a direct current connection between the anodes of said two tubes, a source of potential coupled to both of said anodes solely through a path including a series connected impedance capable of passing direct current, a source of control waves coupled to an electrode of said second tube other than its anode for intermittently biasing said second tube to operate class A, another source of waves for applying modulation to the grid of the second tube during the application of said intermittent bias, means for applying to the grid of the first tube during the intervals when said second tube operates class A a bias of such value as to reduce the flow of current through said first tube, and means for deriving output pulses from the anode of said first tube.

26. In combination in a pulse system, a first multi-electrode vacuum tube having an anode, a multi-electrode amplifier tube having an anode connected to the anode of the first tube over a path capable of passing direct current, a source of potential coupled to both of said anodes through a path including a series connected resistor, means for applying varying amplitude modulation to an electrode of said second tube other than its anode, and means independent of said modulation for intermittently applying a voltage to said second tube to cause the same to conduct and at the same time a bias to an electrode of said first tube other than its anode which reduces the flow of anode current therein when modulation is applied to the second tube, the constants of said system having such values and being so related that with a particular reference value of modulation the voltage changes on the anodes of said tubes substantially balance each other when said first tube is cut-off.

27. In combination in a pulse system, an electron discharge device having an anode, a cathode and a grid, a source of unidirectional potential connected to said anode, a source of modulation coupled to said grid, a rectifier having one electrode directly connected to the cathode of said discharge device and another electrode connected to said source of unidirectional potential, and a common direct current impedance for said cathode and for said one electrode, whereby the flow of current through said rectifier and said common impedance produces a bias which cuts off the flow of anode current through said discharge device, means for intermittently applying recurring waves of such polarity to said rectifier as to cause the cessation of current flow therethrough, and an output circuit coupled to said anode.

28. In combination in a pulse system, an electron discharge device having an anode, a cathode and a grid, a source of operating potential connected to said anode, a source of modulation coupled to said grid, a rectifier having an electrode directly connected to the cathode of said discharge device and another electrode connected to said source of operating potential, and a common direct current impedance for said cathode and for said one electrode, whereby the flow of current through said rectifier and said common impedance produces a bias which cuts off the flow of anode current through said discharge device, means for intermittently applying recurring waves of such polarity to said rectifier as to cause the cessation of current flow therethrough, and an output circuit coupled to an electrode of said discharge device other than said grid.

WILLIAM D. HOUGHTON.

REFERENCES CITED

The following references are of record in the file of this patent:

UNITED STATES PATENTS

| Number | Name | Date |
|---|---|---|
| 2,266,401 | Reeves | Dec. 16, 1941 |
| 2,413,440 | Farrington | Dec. 31, 1946 |
| 2,426,225 | Krause | Aug. 26, 1947 |